United States Patent [19]

Van Daele et al.

[11] Patent Number: 4,724,488
[45] Date of Patent: Feb. 9, 1988

[54] SIGNAL-PROCESSING DEVICE

[75] Inventors: Jean A. Van Daele, Mechlin; Patrick M. Pandelaers, Brussels, both of Belgium

[73] Assignee: Agfa-Gevaert, N.V., Mortsel, Belgium

[21] Appl. No.: 677,683

[22] Filed: Dec. 3, 1984

[30] Foreign Application Priority Data

Dec. 23, 1983 [EP] European Pat. Off. ........ 83201840.2

[51] Int. Cl.$^4$ .............................................. H04N 1/40
[52] U.S. Cl. ..................................... 358/282; 358/283; 358/298
[58] Field of Search ............... 358/280, 282, 283, 284, 358/298; 382/52, 53

[56] References Cited

U.S. PATENT DOCUMENTS 4,575,768  3/1986  Sakai et al. ........................... 358/282

Primary Examiner—Edward L. Coles, Sr.
Attorney, Agent, or Firm—A. W. Breiner

[57] ABSTRACT

A signal-processing device for transforming a digital image signal, that has been obtained by sampling and digitization of a video signal obtained by line-wise scanning of an original, to a binary image signal wherein zero points of the two-dimensional second difference of the digital video signal are determined in order to detect contrast transitions in the original. Unwanted noise components in the video signal are eliminated by masking the second-difference signal.

8 Claims, 6 Drawing Figures $$-\left[\boxed{\begin{array}{|c|c|c|}\hline 1 & 2 & 1 \\\hline\end{array}} \times \boxed{\begin{array}{|c|}\hline 1 \\\hline 2 \\\hline 1 \\\hline\end{array}}\right] + \boxed{\begin{array}{|c|c|c|}\hline 0 & 0 & 0 \\\hline 0 & 16 & 0 \\\hline 0 & 0 & 0 \\\hline\end{array}} \Longrightarrow \boxed{\begin{array}{|c|c|c|}\hline -1 & -2 & -1 \\\hline -2 & 12 & -2 \\\hline -1 & -2 & -1 \\\hline\end{array}}$$

FIG. 3

| a | b | c |
|---|---|---|
| d | e | f |
| g | h | i |

FIG. 3a

SIGNAL-PROCESSING DEVICE

The present invention relates to a signal-processing device for transforming a digital image signal, that has been obtained by sampling and digitisation of a video signal, in its turn having been obtained by line-wise scanning of an original, into a binary image signal.

The binary signals obtained after scanning and processing can be transferred to a suitable printing device for providing a copy of the image. This transfer can take place through cables as well as wirelessly after a suitable modulation. Binary signals are required because the existing printing devices are only suited for printing bivalent information, viz. per pixel black or presence of electrophotographic toner or ink and white or absence of electrophotographic toner or ink.

The scanned image called the original hereinafter can consist of text or photographs or a combination of both.

Upon scanning originals containing both text and photographs it is a large problem to obtain a binary signal that via the printing device renders a text with sharply limited edges and yields true sharp copies of the photograph as well. For that purpose, in known devices, always an occasionally automatic switching takes place between scanning text and scanning photographs, which leads to relatively intricate and expensive devices.

The invention provides to procure a device for signal-processing which has a relatively simple construction and yet gives a very good rendition of images containing both text and photographs or one of both, without having a switching to take place therein.

According to the present invention this object is realized by a signal-processing device of the above named kind which is provided with means for determining the two-dimensional second difference of the digital video signal obtained by line-wise scanning in order to detect contrast transitions in the original, and with means for determining a mask signal for masking the second difference signal in order to eliminate contrast transitions with slope of too low steepness.

In addition thereto the invention provides a device by means of which it is possible to reproduce the scanned original via a printing device in exclusively black-and-white or in black, white and grey tones. Evidently, exclusively black-and-white is most suited for an original wherein only text, in other words, a line work image is comprised, whereas the capability of representing grey tones is a necessity in originals containing only photographs, in other words continuous-tone images or originals comprising continuous-tone images in addition to line work images.

The present invention is based on the insight that for the recognizability of an image by the observer, the contrast transitions, i.e. the transitions between areas with more or less constant brightness such as e.g. at the edge of a character, but also in photographs, are most important. These contrast transitions, that in photographs consist of fictive lines and in characters of the contour of that character, are called contours hereinafter. In the system according to the present invention first the contours of an original are fixed whereupon said contours are filled at choice with black and white tones or also with grey tones.

In order to determine the contours in an image all the slopes of the video signal obtained upon scanning an image line having a height greater than a preliminarily determined height can be detected. According to the present invention, for detecting these slopes the knowledge is used that a point of inflection in a slope is characterized by a zero point of the second difference of the digital video signal. A drawback is that also the slopes of the noise components in the video signal are detected, so that also at the points having no contour at all, a contour point is given by the second difference. In order to solve this problem means are provided that mask the video signal and transmit only signals having a sufficiently high slope. By combining the output signal of the masking chain with the signal obtained by determination of the second difference, undesirable noise components can be eliminated.

The present invention is described hereinafter more detailedly by means of an embodiment with refernece to the drawings in which :

FIGS. 3 and 3a are examples of the matrix used for obtaining the second difference;

Figure 1:
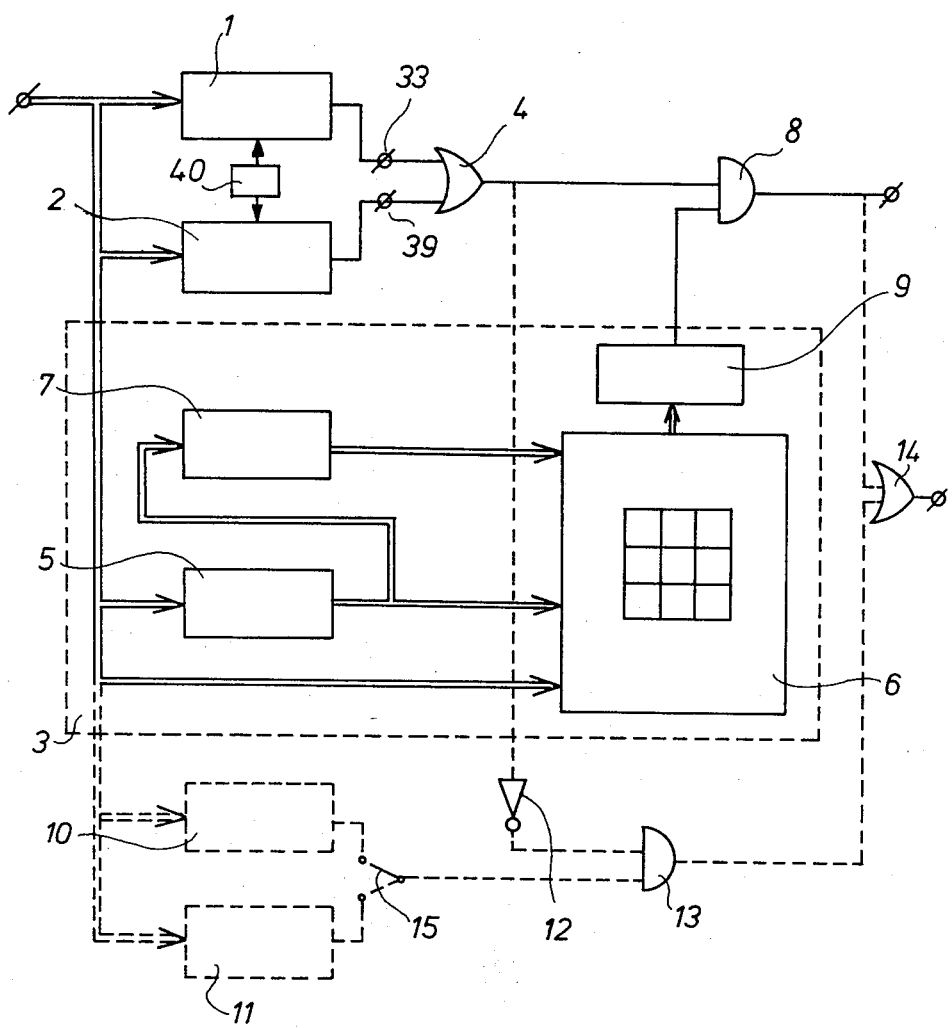
FIG. 1 is a simple block scheme of the signal-processing device according to the present invention.

FIG. 1 shows a strongly simplified block scheme of the signal-processing device according to the present invention. The video signal sampled and digitized by means of techniques known in the art, wherein the grey value in every pixel is characterized by a number of bits, e.g. 6 bits, is coupled to a detector 1 for the vertical first difference, with a detector 2 for the horizontal first difference and with a two-dimensional second-difference computing chain 3 with which contour points can be detected. Because there is talk of a digital signal one cannot speak of the first and second differential but of the first and second difference. The output signal of detection chain 1 is connected to the first input terminal of an OR gate 4, whereas the output signal of detection chain 2 is connected to a second input terminal of OR gate 4.

The output signals of chains 1 and 2 are binary signals having the value 1 as long as the height of the slope measured in horizontal and vertical direction respectively exceeds a threshold value adjustable by means of a source 40 and having the value 0 if this threshold is not exceeded.

The chains 1 and 2 together with OR gate 4 form a mask chain which serves to exclude undesirable noise dots.

For computing the two-dimensional second difference the digital video signal is processed by means of a matrix operator. The entering digitized video signal is delayed in a first delay line 5 during one image line and is fed from this delay line to a first input terminal of the matrix operator chain 6 as well as to a second delay line 7. The output signal of the second delay line 7 is fed to a second input terminal of the operator chain 6, whereas the entering video signal is also fed directly to a third input terminal of the operator chain 6.

In the matrix operator chain 6 a rather accurate approximation of the second differential of the analog video signal is realised by processing the digital video signal, the analog video signal being the signal that is obtained in the first instance upon scanning the original.

The matrix operator chain will be described more detailedly hereinafter. The output signal of the matrix operator chain 6, which reproduces the two-dimensional second difference, is fed to a threshold chain 9 for computing the points of inflection. The result of this operation is a binary signal, which is "1" for contour points and "0" when there is no contour point. Further, the output terminal of chain 9 is connected to a first terminal of an AND gate 8, whose second terminal is connected to the output terminal of the OR gate 4. At the output terminal of AND gate 8, the masked two-dimensional second difference signal is obtained, which gives the contours of the scanned image. This signal can be fed to a printing device known in itself, which prints a black dot whenever the output signal of gate 8 is a logical "1" and so reproduces the contours in black, wherein thanks to working in two dimensions the contours are well closed at their top as well.

In addition to the signal for the contour image, preferably also a second signal is fed to the printing device via the OR gate 14. This second signal cares for the area filling within the contours. By means of switch 15 one can choose between a black-and-white filling via chain 10 or a grey tone filling via chain 11. Chain 10 processes the entering digital video signal by means of a known thresholding technique, whereas chain 11 applies to the digital video signal one or another known electronic process, according to which by the application of screens grey-scale images (pseudo-grey tones) can be obtained. It is important that these filling circuits can only feed signals to the printing device if the local slope steepness is small. This is realized by inverting the output signal of gate 4 in the invertor gate 12 and by feeding this signal together with one of both output signals of chains 10 and 11 to an AND gate 13.

Figure 2:
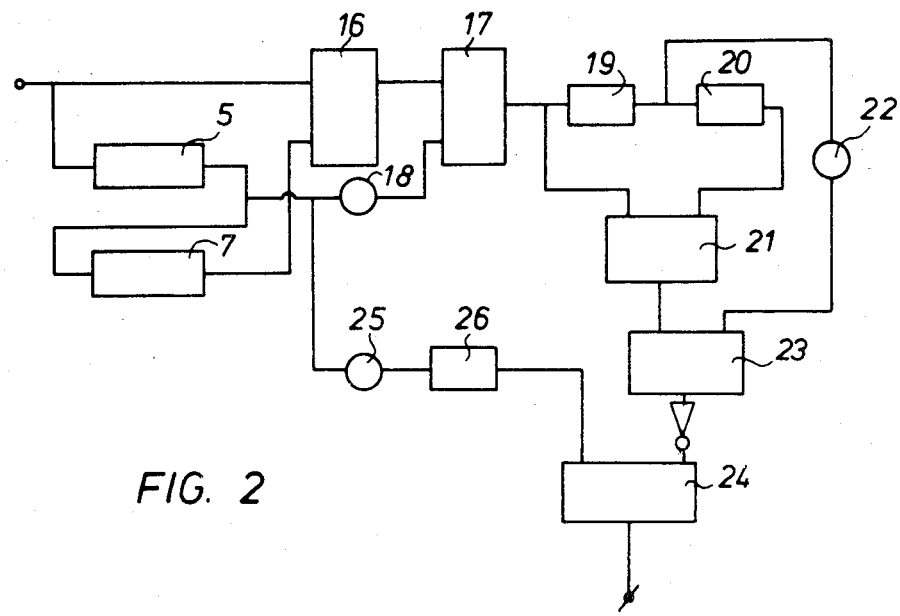
FIG. 2 is a more detailed block scheme of the device for determining the second difference.

FIG. 2 shows in more detail the composition of the matrix operator chain 6 with the delay lines 5 and 7. By means of this chain the digital video signal that represents the grey value in every pixel is transformed in a weighted sum of the grey values of the neighbouring pixels on the foregoing, the present and the following image line according to the scheme shown in FIG. 3. By replacing the value of every pixel by a weighted value wherein also the influence of the surrounding pixels has been taken up, a good approximation of the second difference of the digital video signal can be obtained. Although for multiplying a matrix, consisting of weighted values, with the grey values of corresponding pixels in the immediate neighbourhood of the pixel concerned (an operation that is called convolution), different possibilities exist, according to a preferred embodiment of the present invention a solution has been chosen so that on the one side a relatively large freedom in the choice of the values of the dots of the matrix is possible, and at the other hand the chain for calculating the multiplication remains relatively simple and thus inexpensive.

According to the present invention preferably a matrix operator is chosen that can be separated in a row operator, a column operator and a central addition. The successive processing of the video signal with said row operator and said column operator and the subsequent execution of the addition is completely equivalent to the direct processing of the video signal with the matrix operator, but requires less calculating operations.

The matrix values chosen according to the embodiment are shown in FIG. 3. Self-evidently, it is possible to choose many other values for the matrix element, whereas it is equally not necessary to start from the eight pixels surrounding a determined pixel. For instance, one can consider all 24 pixels surrounding a pixel by mean of a $5 \times 5$ matrix. The difficulty is only that the number of required calculations and hence the required time strongly increases, which requires more rapid and thus more expensive electronic components, if they are available at all. Also with a $3 \times 3$ matrix one can start from a $3 \times 3$ matrix having completely randomly chosen values as matrix elements. Such a matrix, however, surely cannot always be decomposed in a row operator and a column operator of 3 elements, so that instead of 6 multiplications and 5 additions 9 multiplications and 8 additions would be needed, which again makes the device much more complicated and thus more expensive, without an improvement worth mentioning being obtained.

As has been described with reference to FIG. 1, the pixels in chains 5 and 7 are always delayed for one scanning line, so that at the output of chain 5 all pixels of the foregoing image line and at the output of chain 7 those of the image line preceding it are present. The output signal of chain 5 and the signal of the momentaneous digitized video signal entering at the input are summed up in adder 16. The output of chain 16 is connected to the first input of the second adder 17 with whose second input the output of chain 5 is connected, after the output signal of chain 5 has first been multiplied in a chain 18 by a factor 2, which in digital signals, as in the present ones, corresponds with a shift of one position in the binary word.

The output of chain 17 is connected to the input of a delay chain 19, which delays the signal by the period of time of one pixel. The output of chain 19 again is connected to the input of a chain 20, which is identic to chain 19 and at the same time delays the signal the input during one pixel. Each of the outputs of chains 17 and 20 is connected to respective inputs of an adder 21. The output signal of chain 19 is fed to an input of an adder 23 via a shift register 22, which actually multiplies the signal with two in the same way as chain 18 does, the other input of said adder 23 being connected to the output of chain 21. The output of adder 23, which inverts the summed signal, is connected to the first input of an adder 24. The other input of adder 24 receives the output signal of chain 5 after the latter has been shifted by chain 25 over 4 positions and as a matter of fact has been multiplied by a factor 16 and thereafter is delayed by chain 26 for one pixel.

At the output of adder 24 the convolution product forms wherein the signal value of a pixel has been replaced by the weighted value of the eight surrounding pixels and the central pixel by means of the matrix from FIG. 3. The great advantage of the chain according to FIG. 2 is that the two-dimensional second difference can be calculated for every pixel, without a large number of arithmetic operations being necessary therefor.

The action of the chain according to FIG. 2 is as follows. The starting point is that a pixel e, which is an arbitrary pixel on the original to be scanned, has to be convoluted by means of the matrix shown in FIG. 3. Therein the pixels on the foregoing image line are called a, b and c respectively, a being the foregoing pixel on the foregoing image line with respect to e and b being the same pixel as e on the foregoing image line and c being the following pixel on the foregoing image line with respect to e. Further, the pixel preceding pixel e on the same image line is called d and the pixel following on the same image line is called pixel f. Finally on the following image line the foregoing pixel, the same pixel and the following pixel are called g, h and i respectively. FIG. 3a shows the position of the pixels.

At the moment to be considered, the signal of pixel i is present at the input of the chain shown in FIG. 2. At the output of chain 5 the signal of the preceding image line of the corresponding pixels, thus the signal of f, is present, whereas at the output of chain 7 the signal of pixel c is present. At the output of chain 16 a signal $c+i$ forms and at the output of the shift register 18 a signal $2f$, so that at the output of chain 17 a signal $c+i+2f$ forms. At the output of chain 19 the output signal of chain 17 of the foregoing computing cyclus is still present, so that at the output of chain 19 a signal $b+h+2e$ is available, whereas at the output of chain 20 correspondingly a signal $a+g+2d$ is available. At the output of chain 21 a signal $c+i+2f+a+g+2d$ forms and at the output of shift register 22 a signal $2b+4e+2h$ is present, so that at the output of chain 23 after inversion a signal $-c-i-2f-a-g-2d-2b-2h-4e$ forms. At the output of chain 26 it has been shifted over 4 positions, i.e. the signal of the preceding pixel of the preceding line multiplied by 16, i.e. the signal $16e$, so that at the output of chain 24 the desired convolution result is present, viz. $-a-2b-c-2d+12e-g-2f-2h-i$.

Figure 4:
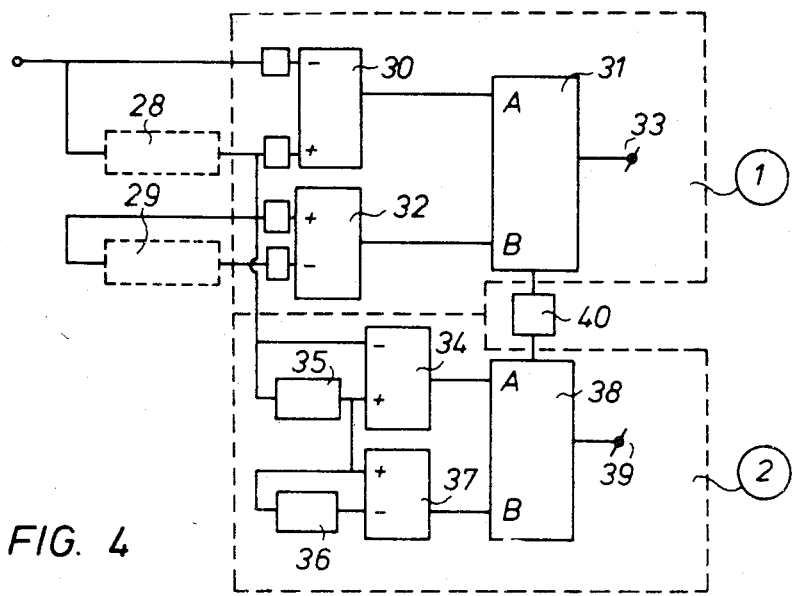
FIG. 4 is a more detailed block scheme of the masking chain.

FIG. 4 shows more details of the composition of chains 1 and 2 of FIG. 1, that are used for realising the masking operation. Chains 1 and 2 are represented in FIG. 1 by dotted lines. The use of a mask is necessary for preventing that noise pixels, which in themselves possess a strongly bent slope with relatively little height and which by the chain for computing the two-dimensional second difference as shown in FIG. 2 are transformed in pixels suited in themselves for indicating a contour, would also be printed in black as contour pixels. This would lead to a great many of undesirable black noise dots in the print.

The mask chain has been arranged for checking if a slope is sufficiently steep and high in order to be considered as a pixel of a contour. For this purpose it is determined if the difference between the present pixel and the foregoing and following pixel, for slopes in horizontal direction, or the difference between a pixel on the present image line and the corresponding pixel in the following and foregoing image line for vertical slopes exceeds a determined threshold value. If so, it is accepted that the slope detected by means of the second difference chain is a slope of a contour, which slope is then transmitted to the printing chain and, if not, the output signal of the second-difference chain is blocked. As contours occur in two dimensions, a mask acting in two dimensions is necessary.

In FIG. 4 chains 28 and 29 are represented, each of which cares for a time delay of the duration of a line and which are preferably the same chains as chains 5 and 7 from FIG. 2. The entering video signal of a pixel is compared in chain 30 after delay for one pixel period with the output signal of chain 28, after the latter has also been delayed for one pixel period, thus with the signal of the corresponding pixel of the preceding line. The output signal is fed to the first input of a comparator 31. The output of chain 28 is also connected to an input of a chain 32 whose other inputer receives the output signal of chain 29 that has been delayed for one pixel period. In chain 32 the output signal of chain 29 is subtracted from that of chain 28 after both has been delayed for one pixel. The output of chain 32 is connected to the second input of comparator 31. An adjustable threshold tension source 40 is connected to a third input of comparator 31. The comparator is arranged in such a way that a signal of value "1" appears at the output 33 when the signal at the first input and/or at the second input of comparator 31 is greater than the value of the threshold tension.

For determining the slope in horizontal direction, the output of chain 28 is connected to a first input of a subtractor 34 and to the output of a chain 35, which provides a time-delay during one pixel. The output of chain 35 is connected to the second input of chain 34 and to the input of a time-delay chain 36 having the same function as chain 35. The output of chain 35 is also connected to a first input of subtractor 37 whose other input is connected to the output of chain 36. Each of the outputs of the subtractors 34 and 37 is connected to the first and second input of the comparator 38 respectively whose third input is connected to the threshold tension source 40. At the output 39 of comparator 38 there is a signal having value 1, when the value of the signal at the first input and/or that a second input of comparator 38 is greater than the value of the threshold tension.

If the same denomination of the pixels is maintained as is used for the explanation of the action of the chain according to FIG. 2, the action of the chain according to FIG. 4 is as follows. At the input of the chain the signal of a pixel i is present, whereas the first input of chain 30 the signal of pixel h is present. At the output of chain 5 the signal of pixel f is present and at the second input of chain 30 the signal of pixel e, so that at the output of chain 30 the signal $e-h$ is present. At the output of chain 7 the signal of pixel c is present and at the inverting input of chain 32 the signal of pixel b. At the other input of chain 33 the signal of pixel e is present so that at the output of chain 32 the signal $e-b$ forms. Accordingly signals $e-f$ and $e-d$ form at the outputs of chains 34 and 37 respectively.

By varying the value of the threshold tension it is possible to determine which slope is still transmitted by means of the output signal of the mask chain and which not.

The output signal of comparator 31 corresponds to the output signal of chain 1 in FIG. 1, whereas the output signal of comparator 38 corresponds with the output signal of chain 2 in FIG. 2. If one of both output signals has a logical value "1", a logical value "1" is present at the output of OR gate 4, which is connected to the first input of AND gate 8 and via the invertor gate 12 also the first input of AND gate 13. The second input of AND gate 8 is connected to the output of the two-dimensional second-difference chain, so that if both input signals of gate 8 have the logical value "1", there is also an output signal "1", whereas in all other cases the output signal is "0". Only when the output signal of gate 8 is "1", a black dot is printed by the printing device to indicate a contour dot.

The second input of AND gate 13 in FIG. 1 is connected to the output of one of both filling chains 10 or 11, so that if the slope is sufficiently high and the output of OR gate 4 gives a logical "1" and hence a logical "0" is present at the input of AND gate 13, the output signal of filling chain 10 or 11 is not transmitted by AND gate 13 and thus cannot influence the printing device. By suitably choosing the threshold value for the slope it is possible, as will be described below, to define around black contour lines a space that always remains white, whereby the contours are outlined even better.

It will be clear that by continuously further lowering the value of the threshold tension of the mask chain, more often slopes having low steepness can be transmitted by the AND gate 8, which at the one side results therein that less steep contour slopes are detected, but on the other hand that more undesirable noise dots will be transmitted and printed, which renders the appearance of the print undesirably disorderly. So, one has always to weigh a maximal contour detection with many noise dots against less contour detection with few or no noise dots outside the contours.

In order to lighten this dilemma means are provided according to the present invention to enhance the contour sharpness without having to make concessions to the noise suppression. For that purpose the threshold chain 9 is provided by means of which the output signal of the two-dimensional second-difference chain is transmitted only when that signal exceeds a determined threshold value situated little above the 0-level of the output signal.

The output signal of the threshold chain is a binary signal having a logical value "1" if the output signal of chain 3 is greater than the threshold value, and a logical value "0" if the output signal of chain 3 is smaller than said threshold value. Whenever the threshold chain gives an output signal "0" and the OR gate 4 a "1", the print is now kept white. The advantage of a threshold value for the output signal of chain 3 being situated a little above the 0-level of said signal, is that computing noise, occasionally still present in that output signal, is not transmitted.

Figure 5:
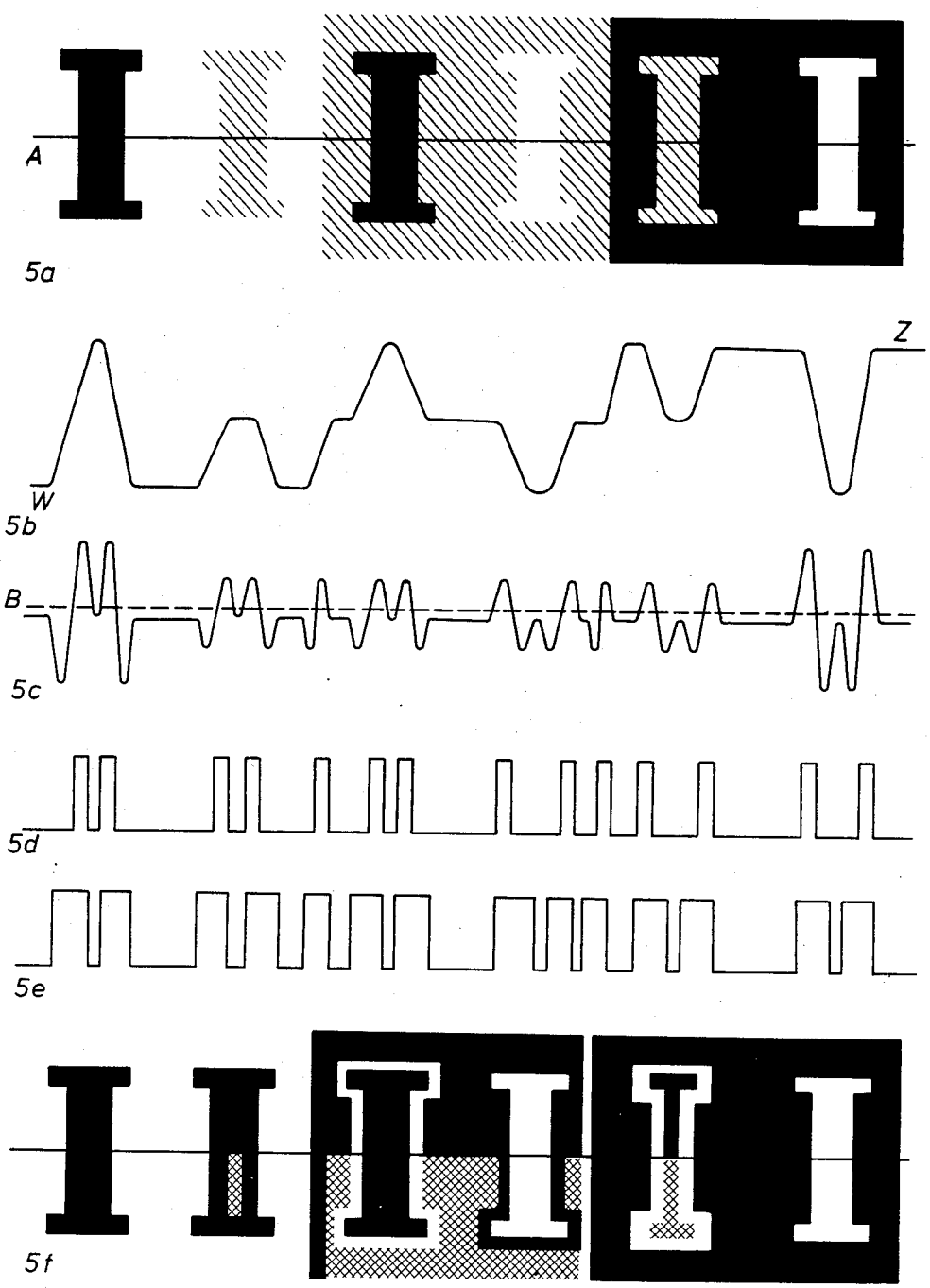
FIG. 5 is an example of a number of characters in an original and the signals obtained upon scanning and processing by means of the device according to the present invention as well as the result finally reproduced through a printing device.

More details will be explained by means of FIG. 5.

FIG. 5a shows as an example the character I as can be contained in an original to be copied. At the left in the fig. a white background having thereon a black and a grey or coloured character I is shown, in the middle of the fig. a grey or coloured background having a black I and a white I thereon is shown, and at the right in the fig. a black background carrying a grey I and a white I is shown.

FIG. 5b shows the analog video signal obtained after scanning the original for one image line which is indicated with A in FIG. 5a. This signal is converted in a known way by means of sampling and digitization into a digital signal for every pixel. From this signal the two-dimensional second difference is calculated. In FIG. 5b the lowest signal level is the white level, whereas the highest signal level is the black level.

FIG. 5c shows the output signal of chain 3 after calculation of the two-dimensional second difference. Although this signal is shown as an analog signal, it actually consists of a large number of successive digital signals for successive image dots. In FIG. 5c the threshold value of threshold chain 9 is indicated by B, which is used for determining the logical contour signal as output signal of chain 3, which contour signal is shown in FIG. 5d.

In FIG. 5e the mask signal which is the output signal of OR gate 4 is represented. At the places where both of the signals 5d and 5e are "1" and thus both inputs of AND gate 8 are "1", the contour pixels are defined. The places where the signal 5d is "0" and that of 5e is "1", always remain white because the output signal "1" of OR gate 4 blocks chains 10 and 11 via invertor 12. As soon as signal 5e is "0", filling circuit 10 or 11 can determine the colour of the print at that place. The threshold value for the mask chain being chosen in such a way according to the embodiment that the pulses of the mask chain as indicated in FIG. 5e are always wider than the pulses determining the black contours, a small area is defined around every black contour wherein the filling chains cannot be active and that thus always remains white, which delineates the contours extra clearly.

FIG. 5f shows the result obtained after printing the contour signal and filling up and by means of the black-and-white or pseudo-grey filling chain, wherein the result obtained by means of the black-and-white filling being shown in the upper part of FIG. 5f and the result obtained with the pseudo-grey filling being shown in the lower part of FIG. 5f. From the latter FIG. it clearly appears that both filling systems provide an ideal representation of the original wherein especially in the black-and-white filling the emphasis of the contours by means of the white contouring offers evident advantages. But also in the pseudo-grey the white delineation favours clarity.

We claim:

1. Signal-processing device for transforming a digital image signal, that has been obtained by sampling and digitization of a video signal obtained by linewise scanning of an original, to a binary image signal, characterized by means for determining zero points of a two-dimensional second difference of a digital video signal in order to detect contrast transitions in an original and means for determining a mask signal for masking said second-difference signal in order to eliminate noise components in said video signal.

2. Device according to claim 1, characterized in that said means for determining said two-dimensional second difference comprise a matrix operator chain, that is arranged for always summing up the weighted value of every pixel to the weighted value of a predetermined number of surrounding pixels on the same image line as well as on a predetermined number of following and foregoing image lines, whereas also means have been provided for comparing said weighted sum with an adjustable threshold value and for creating a binary signal which is representative for the contrast transitions in the original and can be used to indicate image contours.

3. Device according to claim 2, characterized in that said predetermined number of surrounding pixels is two on the same image line and three on the foregoing and the following image line and that said predetermined number of image lines equals one, the pixels being symmetrical around said one pixel.

4. Device according to claim 2, characterized in that said means for determining said two-dimensional second difference comprise a chain for delaying the digital video signal for one image line as well as a chain for again delaying said signal for one image line, whereas also a number of adders, a number of chains wherein the digital image signal can be shifted over one or more bit positions, a number of chains wherein said digital image signal can be delayed for one pixel and a threshold-value chain for comparing the output signal of said two-dimensional second difference chain with an adjustable value are provided.

5. Device according to claim 4, characterized in that five adders, three delaying chains for the duration of a pixel and three shift registers have been provided.

6. Device according to claim 1, characterized in that said means for determining a mask signal for masking said second-difference signal is provided with means for determining the difference in value between a pixel and the foregoing pixel, between said pixel and the following pixel on the same line, and of means for determining the difference in value between said pixel and the corresponding pixel on the following line and between said pixel and the corresponding pixel on the foregoing line.

7. Device according to claim 6, characterized in that means have been provided for giving off a mask signal if none of said determined difference values is greater than an adjustable threshold value that masks the occasional image contour signals in order to feed the latter to an output terminal of the signal-processing device.

8. Device according to claim 1 being provided with means for filling the contours of the original, characterized in that said filling means are inactive when a mask signal is present, in such a way that the contours are bordered at one or both sides by a number of pixels where said means for filling up the contours are inactive.

* * * * *